United States Patent Office 3,557,529
Patented Jan. 26, 1971

3,557,529
PROCESS AND APPARATUS FOR THE SIMULTANEOUS PRODUCTION OF ACETYLENE AND ETHYLENE
Gerhard Ranke, Munich, Germany, assignor to Linde Aktiengesellschaft, Hollriegelskreuth, Germany
Filed Mar. 18, 1968, Ser. No. 713,964
Claims priority, application Germany, Mar. 17, 1967, L 56,033
Int. Cl. B01d 19/00
U.S. Cl. 55—43  14 Claims

ABSTRACT OF THE DISCLOSURE

A process is provided for the simultaneous separation of acetylene and ethylene from a gaseous mixture, wherein the gaseous mixture is washed in two stages with an acetylene solvent, the acetylene being recovered from the loaded solvent by regeneration and the ethylene being obtained from the remaining gas by separating the other components of the gaseous mixture. The solvent is returned to the process in a regenerated form.

BACKGROUND OF THE INVENTION

In the processing of cracking gases to obtain pure acetylene, it is conventional, as disclosed in Linde-Berichte aus Technik und Wissenschaft [Linde Reports from Science and Technology], No. 17, page 15 et seq., after compression, precooling and separation of higher boiling components, such as $CO_2$, $H_2O$, and higher acetylenes from cracking gases, to scrub these gases with a liquid organic solvent, i.e., methanol, and to dissolve the acetylene preferentially over the other components of the cracking gas.

In this process, the ethylene is also dissolved to a certain extent by the scrubbing agent, but can be readily driven off by expansion or heating of the loaded scrubbing agent, so that it contains only dissolved acetylene therein. Subsequent recovery of dissolved acetylene is then accomplished by complete regeneration of the scrubbing agent, during which step the acetylene is driven off in the pure form and the regenerated scrubbing agent is returned to the process.

In conventional processes, the important primary consideration is to obtain acetylene as economically as possible. Consequently, treatment with an acetylene solvent has been conducted in such a manner that only a minimum of other components, i.e., ethylene, are dissolved in the solvent from which acetylene is finally obtained. In such prior art processes, however, a quantity of the acetylene remains in the undissolved gas escaping from the scrubbing column. Generally, however, the loss of such acetylene is of little importance other than the fact that the escaping fraction is not acetylene-free. If the gas contains a sufficient amount of ethylene that is worthwhile to process the gas to obtain pure ethylene, however, the ethylene must be subsequently freed of the other constituents and, in particular acetylene, down to a few parts per million. Such post- or fine-purification can be conducted, for example, in accordance with the process described in German Pat. 953,700. In that process, the acetylene is scrubbed out of a gaseous mixture, consisting substantially of $C_2$-hydrocarbons including a low percentage of acetylene, at a low temperature with an organic solvent, such as acetone. It is possible by means of this process to remove the acetylene up to a few p.p.m. from the remaining gaseous mixture, which latter is then worked up by rectification. The acetone is regenerated in a conventional manner in a regenerating column, whereupon the acetone is again available as the scrubbing medium.

The apparatus required for simple connection of these above two conventional processes in series for the purpose of processing a gaseous mixture to obtain pure acetylene and ethylene is, however, so expensive that the economy of such an operation is questionable.

SUMMARY OF THE INVENTION

It is, therefore, an object of the present invention to provide an improved and more economic process than employed prior art processes for production of pure acetylene and removal of acetylene from the ethylene ethane fraction.

Upon further study of the specification and claims, other objects and advantages of the present invention will become apparent.

These objects are achieved, in a preferred embodiment of the invention, by scrubbing a major portion of acetylene from the gaseous mixture in a first scrubbing column, and then removing the residual minor amounts of the acetylene in a second scrubbing column with the same solvent. The solvents from both scrubbing columns are then regenerated together.

The process of the present invention finds particular utility in separating acetylene and ethylene in pure form from a gaseous mixture consisting essentially of $C_1$- and $C_2$-hydrocarbons and inert gases containing acetylene and ethylene in suitable concentrations.

This invention is thus particularly amenable to treatment of raw gases of the following compositions:

| Component: | General range volume percent |
|---|---|
| Methane | 4–18 |
| Inert gases ($H_2$, $N_2$, CO, etc.) | 50–80 |
| Acetylene | 6–20 |
| Ethylene | 6–20 |
| Ethane | 0.2–2 |

The crude gas is first scrubbed in a first scrubbing column with conventional solvent means suitable for absorbing acetylene, preferably a solvent of the organic type, such, for example, as acetone, methanol, dimethylformamide or n-methyl-pyrrolidone. The scrubbing is accomplished under pressure, generally at about 10 to 30 atmospheres absolute, preferably at a partial pressure of 1.5 to 3.0 atmospheres absolute of acetylene in the crude gas, and at a temperature generally of about −20 to −40, preferably about −25 to −35° C.

The first scrubbing stage is preferably conducted in a column having two sections, the scrubbing process being conducted in the lower section with partially regenerated solvent containing about the same quantity of acetylene which is emerging together with other gases from the head of this column, and in the upper section with completely regenerated solvent. The weight ratio of partially regenerated solvent to completely regenerated solvent in the first column depends on the amount of acetylene and ethylene in the crude gas. The more acetylene and ethylene are contained in the starting gas mixture, the more scrubbing agent is needed in a second scrubbing stage to be described hereinafter. And the entire amount of scrubbing agent of the second scrubbing stage is transferred to the lower section of the first scrubbing column.

The gas exiting from the first scrubbing column, containing residual acetylene on the order of 0.1 to 1, preferably about 0.1 to 0.5%, is then separated in a gas fractionation plant into two fractions by means of rectification, one fraction being withdrawn as residual gas comprising methane and the inert gases. The second fraction, consisting only of $C_2$-hydrocarbons and the residual acetylene, is then fed to a second scrubbing column. (All percentages are by volume unless otherwise noted.)

In the second scrubbing column, the gas is scrubbed only with completely regenerated solvent, the residual acetylene being separated from the remaining $C_2$-hydrocarbons ($C_2H_4$ and $C_2H_6$). The remaining hydrocarbons are freed from all but traces of acetylene on the order of 0.1 to 20 p.p.m. and preferably about <5 p.p.m.

The $C_2$-fraction exiting from the head of the second scrubbing column is then separated in a gas fractionation plant into pure ethylene and an ethane fraction in a known manner.

The contaminated solvent collecting at the bottom of the second scrubbing column is employed, in accordance with an embodiment of this invention, as the scrubbing agent in the lower section of the first scrubbing column, and is withdrawn, together with the loaded solvent descending from the upper section of the first scrubbing column, from the bottom of the first scrubbing column, reduced in pressure to about 1.2 to 3, preferably 1.4 to 2 atmospheres absolute, and passed to the middle portion of a first regenerating column wherein the gas liberated by flashing is again subjected to scrubbing by completely regenerated solvent entering the top section of the column.

The solvent collecting in the bottom of the first regenerating column has a varying concentration of acetylene, which depends mainly on the partial pressure of acetylene in the crude gas. In any case the upper limit of the acetylene concentration in the solvent is fixed by the local safety regulations. The solvent has an ethylene concentration of about 0.1 to 1, preferably 0.1 to 0.5% of the amount of solved acetylene. In contrast, after being completely regenerated in the second regenerating column, the weight concentration of acetylene is less than 50, preferably less than 20 p.p.m., and the concentration of ethylene is less than 25, preferably less than 10 p.p.m.

The flashing of the combined solvent in the first regenerating column and subsequent scrubbing of the liberated gases therein quantitatively remove from the solvent any substances which were concomitantly dissolved in the first scrubbing column, such as $C_2H_4$ and $C_2H_6$. This expansion and subsequent scrubbing also returns any residual amounts of $C_2H_2$ which were simultaneously removed during the expansion step to the solvent. In this connection, it is advantageous to recycle the liberated gases to the crude gas upstream of the first scrubbing column, to increase the yield of ethylene.

The sump of the first regenerating column is communicated to the upper portion of a second regenerating column. The sump of the second regenerating column is heated, so that the entire amount of acetylene dissolved in the solvent contained therein is driven off and can be withdrawn in pure form from the head of that column.

The completely regenerated solvent from the sump of the second regenerating column then is utilized to scrub acetylene in the first and second scrubbing columns, and in the first regenerating column.

In the process of this invention, instead of only the solvent from the second scrubbing column having only a small amount of acetylene dissolved therein being employed as an additional scrubbing medium in the first scrubbing column, both solvents are regenerated together, and an advantage is thereby obtained that the requirement for a regenerating plant for regeneration of the solvent from the second scrubbing column is eliminated, thereby reducing the required expenditure for the apparatus.

An additional advantage is realized in that the acetylene dissolved in the solvent of the second scrubbing column is returned to the first scrubbing column and thus into the $C_2H_2$ product without requiring compression and energy consumption. Without such an interconnection of the two scrubbing columns, acetylene contained in the solvent from the second scrubbing column, to be recovered, would have to be driven off by expansion or hot regeneration, subjected to a post-compression step, and recycled into the crude gas.

According to a particular embodiment of the present invention, provision is made to subject the loaded solvent from the second scrubbing column to a partial expansion, before introduction into the first scrubbing column. The gases liberated in the partial expansion are recompressed and mixed with the gas fed to the second scrubbing column from the first scrubbing column to thereby liberate a portion of the $C_2$-hydrocarbons present in the solvent in addition to the acetylene. This liberated portion of the gas then may be passed through the second scrubbing column. If the above step were not conducted, the liberated $C_2$-hydrocarbons would again be conducted into the first scrubbing column with the solvent to be partially liberated therein, and would again pass through the gas fractionation plant for separation of inert substances therefrom, a step that is not required since the gas passing into the second scrubbing stage is free of inert substances. In place of the above-described partial expansion, the solvent can be heated with similar results, thereby avoiding a post-compression step.

According to a further embodiment of the present invention, the first scrubbing column can be fed solely by partially regenerated solvent from the second scrubbing column. In this embodiment of the invention, although the gas from the head of the first scrubbing column has a higher acetylene content, the process can be conducted with a substantially reduced number of scrubbing plates in the first scrubbing column and simultaneously with a reduction in the amount of scrubbing medium required, thereby resulting in a smaller, more compact regenerating column. Although, in the thermal cracking of higher hydrocarbons, it is quite possible to select the cracking conditions in such a manner that a gas containing acetylene as well as ethylene in amounts sufficient for making the production of both components from the cracking gas economically feasible is produced, it is simpler in many cases to conduct two cracking processes separately from each other, one yielding as large an amount of acetylene as possible, and the other one yielding as large a quantiy of ethylene as possible. The process of this invention exhibits the decisive advantage that it can also be employed in processing these differing gaseous mixtures.

In the latter case, the cracking gas which is rich in acetylene is introduced into the first scrubbing column and then subjected to the process of this invention in the manner set out above. The other cracking gas, however, which is rich in ethylene, is injected in accordance with a further development of this invention downstream of the first scrubbing column. This provides the advantage that the first scrubbing column is loaded with the reduced amount of acetylene rich gas, while the minor amount of acetylene in the ethylene rich gas can be readily removed in the second scrubbing column.

Th invention will furthermore be explained in greater detail with reference to two schematically illustrated embodiment wherein like numerals throughout the figures thereof indicate like components and wherein:

DESCRIPTION OF THE PREFERRED EMBODIMENT

Figure 1:
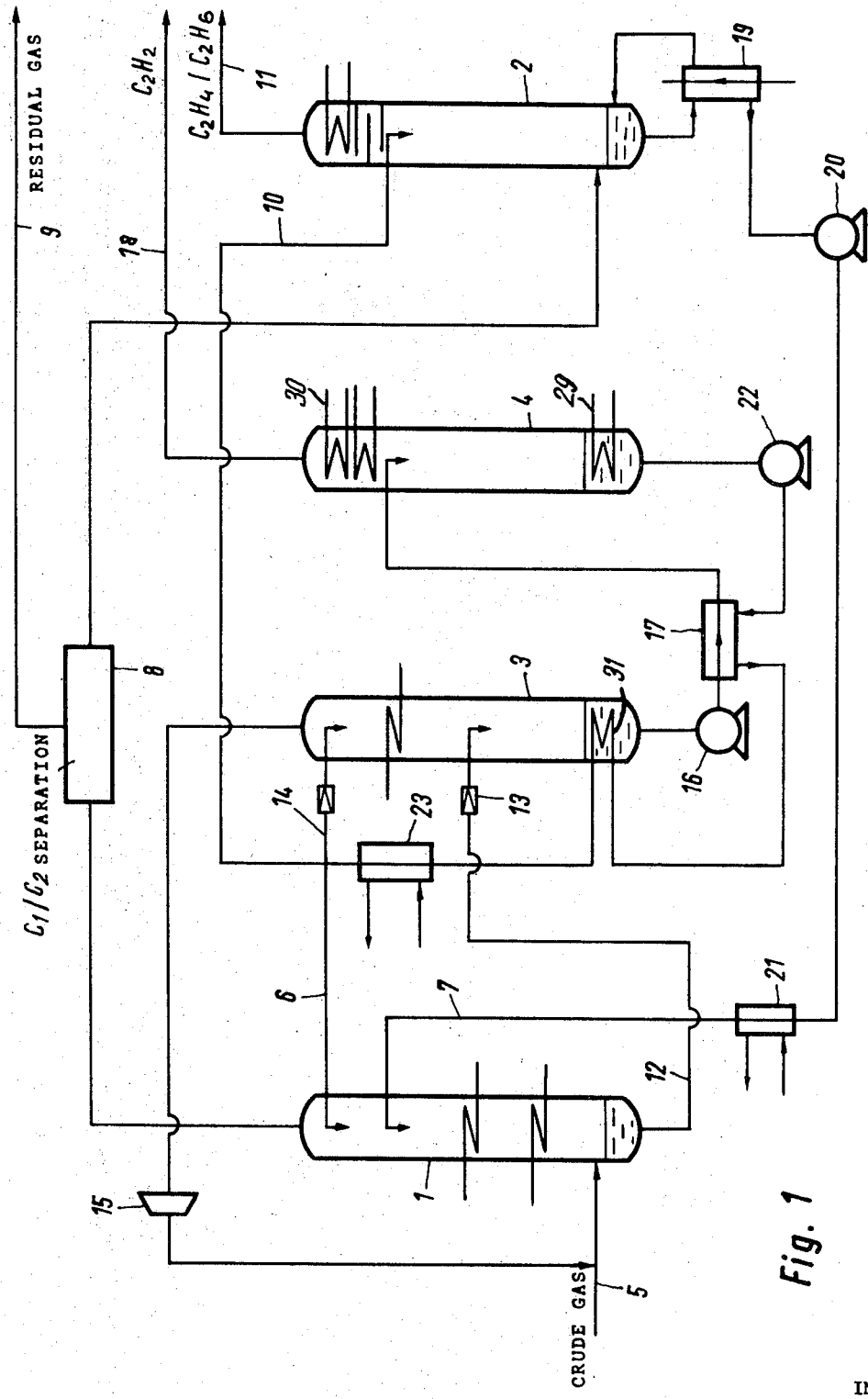
FIG. 1 is a schematic view of an apparatus for performing the process in accordance with the invention and specifically adapting it to processing a gaseous mixture having a substantial content of both acetylene and ethylene.

The plant illustrated in FIG. 1 comprises a first scrubbing column 1, a second scrubbing column 2, a first regenerating column 3, and a second regenerating column 4. A $C_3$-free gaseous mixture is introduced into the scrubbing column 1 through a conduit 5. As an example, the incoming gaseous mixture has the following composition (upstream of the juncture with the exhaust from the compressor 15):

| | Nm.$^3$/h. |
|---|---|
| $H_2$ | 37,600 |
| $N_2$ | 1,400 |
| CO | 15,580 |
| $CH_4$ | 15,540 |
| $C_2H_2$ | 10,140 |
| $C_2H_4$ | 18,940 |
| $C_2H_6$ | 800 |

In a preferred embodiment, the gas is introduced under a pressure of between 10 and 30, and preferably about 15.5 atmospheres absolute. A conduit 6 transmits acetone at a rate of between 50 and 150 and preferably about 99 tons per hour at a temperature of between —20 and —40 and preferably about —25° C. to the upper portion of the scrubbing column 1. Partially regenerated acetone from the scurbbing column 2 is introduced at a temperature of between —20 and —40° C. and preferably about —25° C. to the middle section of column 1 through a conduit 7 at a rate of between 8 and 25 and preferably about 16 tons per hour. Both have the effect that, as a result of scrubbing in the scrubbing column 1, the major portion of acetylene contained in the crude gas is scrubbed therefrom so that, in the above-described preferred embodiment, the gas fed from the head of the scrubbing column 1 to a gas fractionation plant 8 contains about 550 Nm.$^3$/h. of acetylene in a total of about 91,260 Nm.$^3$/h. of gas.

In the gas fractionation plant 8, the gas is rectified into residual gas containing all of the $H_2$, $N_2$, CO and $CH_4$ and a minor portion of the $C_2H_4$ from the crude gas exiting through a conduit 9, and a $C_2$-fraction containing, in addition to all of the $C_2H_4$ and $C_2H_6$, 540 Nm.$^3$/h. of acetylene in the preferred process. The $C_2$-fraction is then introduced at a pressure of between 1.5 and 20, and preferably about 6 to 12 atm. abs. into the bottom of the scrubbing column 2.

In the scrubbing column 2, the $C_2$-fraction is washed under a pressure of between 6 and 12 atm. abs., and preferably about 10 atm. abs. with between 8 and 25, and preferably about 16 tons per hour of pure acetone fed to the column 2 through a conduit 10 at a temperature of between —20 and —40° C., and preferably about —25° C. In the preferred process, about 18,540 Nm.$^3$/h. $C_2H_4$ with about 792 Mm.$^3$/h. $C_2H_6$ containing about 1 p.p.m. of $C_2H_2$ exit through a conduit 11 from the head of the scrubbing column 2. The $C_2H_4$/$C_2H_6$ mixture is then separated in a plant (not shown) into ethylene and ethane by rectification.

The loaded solvent collecting at the bottom of the scrubbing column 1 is withdrawn through a conduit 12, expanded in a throttle 13 to a pressure of between 1.2 and 3 atm. abs. and preferably about 1.5 atm. abs., and fed to the first regenerating column 3. Between 20 and 50 tons per hour and preferably about 35 tons per hour of pure acetone at a temperature of between —20 and —40 and preferably about —25° C. are injected into the column 3 through a conduit 14 to flow against the gases liberated during expansion. In the preferred embodiments, gas exiting from the head of this column has the following composition:

| | Nm.$^3$/h. |
|---|---|
| $H_2$ | 57 |
| $N_2$ | 3 |
| CO | 83 |
| $CH_4$ | 250 |
| $C_2H_2$ | 25 |
| $C_2H_4$ | 3,130 |
| $C_2H_6$ | 132 |

This gas is again compressed to pressure of the crude gas in compressor 15 and admixed with the gas in the conduit 5.

The acetone collecting at the bottom of the first regenerating column 3, containing substantially only acetylene, is conducted by means of a pump 16 to the second regenerating column 4, after being preheated in a heat exchanger 17. The regenerating column 4, operated at a pressure of between 1.2 and 2, and preferably about 1.5 atm. abs., is provided with a heater 29 at its lower end, to completely drive off the acetylene dissolved in the acetone. In order to recondense the solvent vapors, the regenerating column 4 is equipped at the head with one or more coolers 30. In the preferred process, the acetylene exiting from the head of the regenerating column 4 through conduit 18 contains in addition to about 10,130 Nm.$^3$/h. of acetylene, about 5 Nm.$^3$/h. of $C_2H_4$ and 1 Nm.$^3$/h. of $C_2H_6$.

The bottom of the scrubbing column 2 is provided with a heater 19 which serves to drive a major portion of the ethylene and ethane which was concomitantly dissolved in the scrubbing column 2 out of the solvent under the pressure of the scrubbing column 2. The partially regenerated solvent is then recycled through a pump 20 and the conduit 7 to the scrubbing column 1. After leaving the heater 19, the partially regenerated solvent at a temperature of between —20 and +20 and preferably about 0° C., is again cooled to between —20 and —40 and preferably about —25° C. in a cooler 21. The solvent transmitted through the conduit 7 to the column 1 contains, in the preferred process, about 540 Nm.$^3$/h. of $C_2H_2$, 821 Nm.$^3$/h. of $C_2H_4$ and 35 Nm.$^3$/h. of $C_2H_6$.

Complete regeneration of the total amount of acetone is accomplished, as mentioned above, in the regenerating column 4. The regenerated acetone is pumped by a pump 22 to the inlet end of the plant, during which procedure it is cooled in the heat exchanger 17 and in a pipe coil 31, disposed in the bottom of the regenerating column 3, in heat exchange relationship to the acetylene-loaded acetone and then cooled to between —20 and —40 and preferably about —25° C. in a cooler 23, cooled by evaporating ammonia. After leaving the cooler 23, the pure acetone is distributed via the conduits 6, 14 and 10 to the columns 1, 3 and 2.

Figure 2:
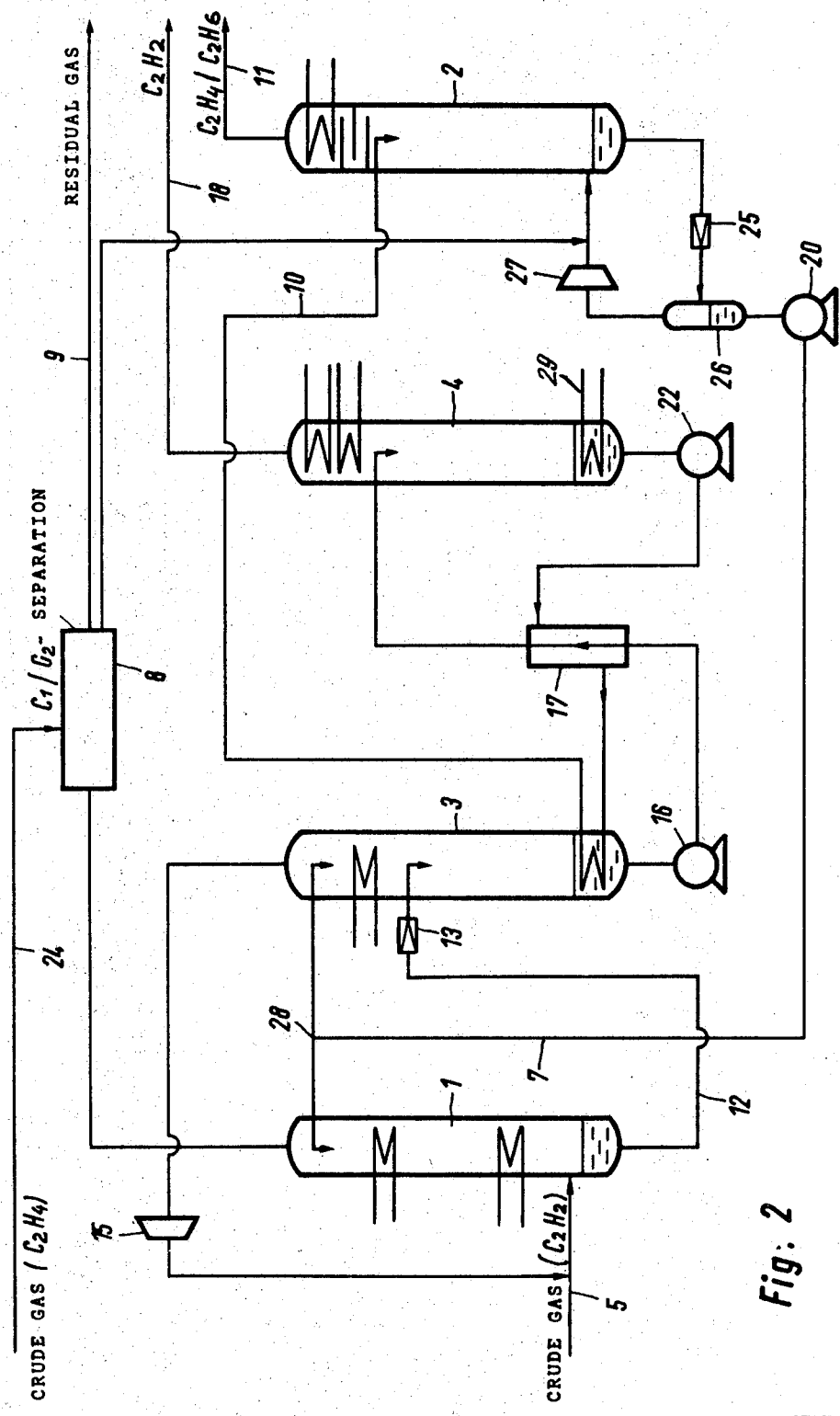
FIG. 2 is a schematic view of another apparatus in accordance with the invention specifically adapted to processing separate mixtures of acetylene-rich and ethylene-rich gases.

In the modification of the process of this invention illustrated in FIG. 2, all components corresponding to those of FIG. 1 bear identical reference numerals. In contradistinction to the embodiment shown in FIG. 1, in the embodiment of FIG. 2 two gases are employed. A crude gas rich in acetylene enters the plant through conduit 5. A gas suitable for this purpose contains about 6 to 20% acetylene and about 1 to 20% ethylene. Another cracking gas poor in acetylene but rich in ethylene is fed through conduit 24. Such a gas could comprise a mixture containing about 15 to 50% ethylene and about 0.2 to 4% acetylene. The ethylene rich gas is fed directly to the gas fractionation plant 8, wherein it is separated, together with the gas coming from the head of the scrubbing column 1, into a residual gas fraction containing methane and the inert gases and a $C_2$-fraction. The residual gas fraction is withdrawn through conduit 9, whereas the $C_2$-fraction is fed to the scrubbing column 2 at a pressure of between 1.5 and 20 and preferably about 6 to 12 atm. abs.

Contrary to the embodiment shown in FIG. 1, the loaded solvent from the scrubbing column 2 is not heated, but expanded in a throttle 25 to a pressure of between 1 and 10 atm. abs. and preferably about 1 to 5 atm. abs. and conducted to a separator 26. The gases liberated during the expansion, consisting preferably of ethylene and ethane having a lower solubility, are compressed in a compressor 27 to the pressure of the $C_2$-fraction and fed, together with the latter, into the scrubbing column 2. The partially regenerated solvent from the separator 26 is pumped, with the aid of the pump 20, through the conduit 7 toward the first scrubbing column 1. As can be seen from the drawing, however, the entire amount of partially regenerated solvent is not conducted to the scrubbing column 1 but is branched off at 28, one partial stream being fed to the head of the scrubbing column 1, and the other partial stream being introduced to the head of the first regenerating column 3. Thus, in this mode of operating the process, the scrubbing processes in the scrubbing column 1 and in the regenerating column 3 are conducted with partially regenerated solvent in the absence of completely regenerated solvent.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for the simultaneous production of acetylene and ethylene from a gaseous mixture containing same, comprising the steps of scrubbing the gaseous mixture with solvent selective for acetylene, desorbing the acetylene during regeneration, recycling resultant regenerated solvent to the scrubbing step, separating ethylene from resultant acetylene-depleted and scrubbed gas, the improvement comprising:

scrubbing the gaseous mixture in a first stage to remove a mapor portion of acetylene;

said first scrubbing stage comprising two sections, the scrubbing in the final section being conducted with fully regenerated solvent and in the initial section with partially regenerated solvent;

scrubbing the resultant gaseous mixture from said first scrubbing stage with fully regenerated solvent in a second scrubbing stage separate and distinct from said first scrubbing stage to remove additional acetylene;

partially regenerating solvent recovered from said second scrubbing stage for utilization in the initial section of said first scrubbing stage;

employing a common solvent system in both scrubbing stages; and regenerating the solvent from both scrubbing stages in a common regeneration zone.

2. A process according to claim 1 wherein partial regeneration is accomplished by expansion of the recovered solvent from said second scrubbing stage.

3. A process according to claim 1 wherein partial regeneration is accomplished by heating the recovered solvent from said second scrubbing stage.

4. A process according to claim 1 wherein the solvent recovered from said first scrubbing stage is completely regenerated and fed to said first and second scrubbing stages in the form of pure solvent.

5. A process according to claim 4 wherein complete regeneration of the solvent recovered from said first scrubbing stage is conducted in series in first and second regenerating stages.

6. A process according to claim 5 wherein the gas liberated in said first regenerating stage is recycled to the unscrubbed gaseous mixture.

7. A process according to claim 1 wherein the gas liberated during partial regeneration of the solvent recovered from said second scrubbing stage is recycled to said second scrubbing stage.

8. A process according to claim 1 wherein the solvent recovered from said first scrubbing stage is completely regenerated, a portion of the completely regenerated solvent being fed to the final section of said first scrubbing stage.

9. In a process for the simultaneous production of acetylene and ethylene from a gaseous mixture containing same, comprising the steps of scrubbing the gaseous mixture with solvent selective for acetylene, desorbing the acetylene during regeneration, recycling resultant regenerated solvent to the scrubbing step, seperating ethylene from resultant acetylene-depleted and scrubbed gas, the improvement comprising:

scrubbing the gaseous mixture in a first stage to remove a major portion of acetylene;

separating the resultant gaseous mixture into a $C_1$-hydrocarbon rich fraction and a $C_2$-hydrocarbon rich fraction;

scrubbing the resultant $C_2$-hydrocarbon rich fraction in a second scrubbing stage separate and distinct from said first scrubbing stage to remove additional acetylene;

employing a common solvent system in both scrubbing stages; and regenerating the solvent from both scrubbing stages in a common regeneration zone.

10. In a process for the simultaneous production of acetylene and ethylene from a gaseous mixture containing same, comprising the steps of scrubbing the gaseous mixture with solvent selective for acetylene, desorbing the acetylene during regeneration, recycling resultant regenerated solvent to the scrubbing step, separating ethylene from resultant acetylene-depleted and scrubbed gas, the improvement comprising:

scrubbing the gaseous mixture in a first stage to remove a major portion of acetylene;

scrubbing at least a fraction of the resultant gaseous mixture in a second scrubbing stage, separate and distinct from said first scrubbing stage, to remove additional acetylene;

employing a common solvent system in both scrubbing stages;

partially regenerating the solvent from said second scrubbing stage and feeding at least a portion of the partially regenerated solvent to said first scrubbing stage; and regenerating the solvent from both scrubbing stages in a common regeneration zone.

11. A process according to claim 10 wherein the solvent recovered from said first scrubbing stage is completely regenerated in a first and second regenerating stage, the remainder of the partially regenerated solvent from said second scrubbing stage being utilized in said first regenerating stage.

12. In a process for the simultaneous production of acetylene and ethylene from a first acetylene-rich and a second ethylene-rich gaseous mixture comprising the steps of scrubbing the gaseous mixture with solvent selective for acetylene, desorbing the acetylene during regeneration, recycling resultant regenerated solvent to the scrubbing step, separating ethylene from resultant acetylene-depleted and scrubbed gas, the improvement comprising:

introducing said first mixture into the process upstream of a first scrubbing stage;

scrubbing the gaseous mixture in said first stage to remove a major portion of the acetylene;

introducing said second mixture into the process downstream of said first scrubbing stage;

scrubbing at least a fraction of the resultant gaseous mixture in a second scrubbing stage separate and distinct from said first scrubbing stage to remove additional acetylene;

employing a common solvent system in both scrubbing stages; and regenerating the solvent from both scrubbing stages in a common regeneration zone.

13. An apparatus for the simultaneous production of acetylene and ethylene from a gaseous mixture comprising a first and second scrubbing column and a first and second regenerating column;

means to communicate the sump of said second scrubbing column with the upper section of said first scrubbing column;

means to communicate the sump of said first scrubbing column with the middle section of said first regenerating column;

means to communicate the sump of said first regenerating column with the upper section of said second regenerating column;

means to communicate the head of said first scrubbing column with the bottom section of said second scrubbing column; and means to communicate the sump of said second regenerating column with the upper sections of said first scrubbing column, said first regenerating column and said second scrubbing column.

14. An apparatus for the simultaneous production of acetylene and ethylene from a gaseous mixture comprising a first and second scrubbing column and a first and second regenerating column;

a gas fractionation plant communicative with the head of said first scrubbing column and the bottom of said second scrubbing column;

means to communicate the sump of said second scrubbing column with the upper section of said first scrubbing column;

means to communicate the sump of said first scrubbing column with the middle section of said first regenerating column;

means to communicate the sump of said first regenerating column with the upper section of said second regenerating column; and means to communicate the head of said first scrubbing column with the bottom section of said second scrubbing column.

References Cited

UNITED STATES PATENTS

| 2,830,677 | 4/1958 | Coberly | 55—43 |
| 3,325,972 | 6/1967 | Friz et al. | 55—65 |
| 3,363,400 | 1/1968 | Takao et al. | 55—63 |

FOREIGN PATENTS

| 1,020,676 | 2/1966 | Great Britain. | 55—65 |

REUBEN FRIEDMAN, Primary Examiner

C. N. HART, Assistant Examiner

U.S. Cl. X.R.

55—64